(12) United States Patent
Pierce et al.

(10) Patent No.: US 7,305,548 B2
(45) Date of Patent: Dec. 4, 2007

(54) USING ATOMIC MESSAGING TO INCREASE THE SECURITY OF TRANSFERRING DATA ACROSS A NETWORK

(75) Inventors: Shaun D. Pierce, Redmond, WA (US); Mark H. Lucovsky, Sammamish, WA (US); Shaun D. Cox, North Bend, WA (US); Richard B. Ward, Redmond, WA (US); Paul J. Leach, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 885 days.

(21) Appl. No.: 10/277,382

(22) Filed: Oct. 22, 2002

(65) Prior Publication Data

US 2003/0084292 A1 May 1, 2003

Related U.S. Application Data (60) Provisional application No. 60/339,608, filed on Oct. 22, 2001, provisional application No. 60/339,490, filed on Oct. 22, 2001.

(51) Int. Cl.
*H04L 9/00* (2006.01)
(52) U.S. Cl. ............... 713/155; 713/185; 713/184; 713/183; 380/28; 380/29; 380/30; 380/44
(58) Field of Classification Search ........ 713/182–186, 713/165, 155, 168; 726/2, 14, 9, 20; 709/225, 709/223; 707/104.1; 380/277, 271, 44, 380/28–30
See application file for complete search history.

(56) References Cited

U.S. PATENT DOCUMENTS 5,862,322 A 1/1999 Anglin et al. ............... 714/57
5,970,248 A 10/1999 Meier ...................... 717/125
5,974,416 A * 10/1999 Anand et al. ............... 707/10
5,974,568 A 10/1999 McQueen .................. 714/38
6,090,154 A 7/2000 Jeffries et al. ............. 717/125

(Continued)

OTHER PUBLICATIONS

Automatic Verification of Cryptographic Protocols with Setheo, J. Schumann, Automated Deduction—CADE-14. 14th International Conference on Automated Deduction. Proceedings Springer-Verlag, Berlin, Germany, 1997, pp. 87-100.

(Continued)

*Primary Examiner*—T. B. Truong
(74) *Attorney, Agent, or Firm*—Workman Nydegger (57) ABSTRACT

A client sends a request to an authentication server requesting access to a service at an application server. The authentication server returns a token containing an encrypted version of a session key that was encrypted using a secret shared between the authentication server and the application server. The client encrypts application data using a corresponding unencrypted version of the session key and text-encodes both the encrypted application data and the encrypted version of the session key. The text-encoded application and text-encoded encrypted version of the session key are both included in a message and sent to the application server. The application server decrypts the encrypted version of the session key using the shared secret so as to reveal the unencrypted version of the session key. The application server then decrypts the encrypted application data using the revealed unencrypted version of the session key.

26 Claims, 4 Drawing Sheets

U.S. PATENT DOCUMENTS

| | | | |
|---|---|---|---|
| 6,246,771 B1 * | 6/2001 | Stanton et al. | 380/286 |
| 6,363,503 B1 | 3/2002 | Clauss et al. | |
| 6,618,806 B1 * | 9/2003 | Brown et al. | 713/186 |
| 6,735,721 B1 | 5/2004 | Morrow et al. | 714/57 |
| 6,819,766 B1 * | 11/2004 | Weidong | 380/277 |
| 6,892,379 B2 | 5/2005 | Huang | 717/140 |
| 7,036,052 B2 | 4/2006 | Peirce et al. | 714/57 |
| 7,080,359 B2 | 7/2006 | Ullmann et al. | |
| 2003/0204804 A1 | 10/2003 | Petri et al. | |
| 2006/0150036 A1 | 7/2006 | Pierce et al. | 714/57 |

OTHER PUBLICATIONS

Secure RPC Authentication (SRA) for Telnet and FTP, D.R. Safford, D.K. Hess and D.L. Schales, Proceedings of USENIX: 4th UNIX Security Symposium USENIX Assoc., Berkeley, CA, USA, 1993, pp. 63-67.

Webgroup: A Secure Group Access Control Tool for the World-Wide Web, F.A.P Petitcolas and Kan Zhang, Proceedings Seventh IEEE International Workshop on Enabling Technologies: Infrastructure for Collaborative Enterprises (WET ICE '98) (Cat. No.98TB100253) IEEE Comput. Soc , Los Alamitos, CA, USA 1998, pp. 301-305.

U.S. Appl. No. 60/339,608, filed Oct. 22, 2001, Mark Lucovsky.

U.S. Appl. No. 60/339,490, filed Oct. 22, 2001, Mark Lucovsky.

Microsoft Press Computer Dictionary Third Edition, "stack", Microsoft Press, 1997, p. 447.

Office Action mailed Jul. 26, 2005, cited in related U.S. Appl. No. 10/277,446 (Attached and referred to as "Document 1").

Office Action mailed Dec. 14, 2005, cited in related U.S. Appl. No. 10/277,446 (Attached and referred to as "Document 2").

Notice of Allowance mailed Jan. 26, 2006, cited in related U.S. Appl. No. 10/277,446 (Attached and referred to as "Document3").

Office Action mailed May 8, 2007, cited in related U.S. Appl. No. 11/362,974 (Attached and referred to as "Document 4").

Notice of Allowance mailed Sep. 13, 2007, cited in related U.S. Appl. No. 11/362,974(Attached and referred to as "Document 5").

* cited by examiner

USING ATOMIC MESSAGING TO INCREASE THE SECURITY OF TRANSFERRING DATA ACROSS A NETWORK

CROSS-REFERENCE TO RELATED APPLICATION

The present application claims priority to commonly-assigned, U.S. provisional application Ser. No. 60/339,608, filed Oct. 22, 2001, which is entitled "Identity-Based Service Fabric", which provisional application is incorporated herein by reference in its entirety. The present application also claims priority to commonly-assigned, co-pending, U.S. provisional application Ser. No. 60/339,490, filed Oct. 22, 2001, which is entitled "Identity-Based Service Communication Using XML Messaging Interfaces", which provisional application is incorporated herein by reference in its entirety.

BACKGROUND OF THE INVENTION

1. The Field of the Invention

The present invention relates to securing network communication, and more specifically, to mechanisms for including a significant portion of the information needed to securely process a message within the message.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form computer networks over which the computer systems can communicate electronically to share data. As a result, many of the tasks performed at a computer system (e.g., accessing electronic mail and web browsing) include electronic communication with one or more other computer systems via a computer network (e.g., the Internet).

Communicating electronically via a computer network typically includes transferring electronic messages between computer systems to cause the computer systems to operate in a desired manner. To transfer an electronic message, the electronic message is typically broken down into corresponding data packets at a sending computer system, the data packets are transferred from the sending computer system via one of more communication links to a receiving computer system (often referred to as transferring data packets "over-the-wire"), the data packets are then used to reconstruct the message at the receiving computer system. In limited cases, data packets may be transferred over a communication link that directly couples one computer system to another computer system (i.e., a one-to-one relationship). However much more frequently, a communication link is utilized by a number of computer systems in a many-to-many relationship. For example, a number of clients connected to an Internet Service Provider ("ISP") may each be able to electronically communicate with all the other clients connected to the ISP (as well as users connected to other ISPs).

Further, communication links often exist in a web configuration (e.g., the Internet) where any one of a number of different combinations of communication links can be used for electronic communication between two computer systems. This is beneficial as it provides some level of redundancy. That is, if one communication link fails a number of other communication links may still provide communication between computer systems. To further facilitate efficient electronic communication between computer systems many communication links of a network, especially those on the Internet, are made publicly available. That is, if a computer system is able to access such a network, the computer system inherently has access to all the public communication links connected to the network. This promotes free flow of information between computer systems (and their users) without significant restraints of the type of data that can be transferred or the network applications that can be executed.

Due at least in part to the ease and efficiency of electronic communication, the number and diversity of entities that use electronic communication is quite large. However, since each computer system coupled to a computer network potentially has access to all the public communication links that couple other computer systems to the network, there is some risk that a malicious user could intercept data packets being sent between computer systems. To compound the problem, some protocols used for electronic communication, such as, for example, the HyperText Transfer Protocol ("HTTP") typically send communication between computer systems in clear text data packets. That is, if the text "Balance=$5,000" were included in an HTTP related message, this exact text would be sent over-the-wire. While the text may be broken down into a number of different clear text data packets, the clear text data packets could be processed at any computer system to easily reconstruct this text. Thus, if the clear text data packets were intercepted at the computer system of a malicious user, the malicious user could easily interpolate that the text was associated with financial data.

In some cases, such as, for example, when browsing news items or other public information, this risk may be tolerable as the data to be included in the clear text data packets is already public and accessible to a large number of computer systems. However, in a large number of other cases, such as, for example, when the data to be included in clear text data packets includes financial or sensitive personal information, the risks associated with transferring clear text data packets may be unacceptable. As such, methods for making intercepted data packets harder to decipher into a meaningful format have been developed.

One method to protect data being transferred between computer systems is to encrypt the data before it is send and decrypt the data after it is received. Thus, if data is intercepted as it travels over-the-wire the difficulty of deciphering the data can be increased, and depending on the type of encryption can be made nearly impossible. However, for encryption to be of benefit the sender and the receiver of the encrypted data must establish keys (secret codes typically used by computerized encryption algorithms) for both encrypting and decrypting data. Thus, computer systems will typically exchange a number of configuration parameters to establish these keys before any user related data is transferred. This initial exchange of configuration parameters is often referred to as a "handshake."

One example of such a handshake is a Secure Socket Layers ("SSL") handshake sequence. An SSL handshake allows a server to authenticate itself to a client using public-key techniques and then allows the client and server to cooperate in the creation of session keys used for encryption, decryption, and tamper detection during a subsequent data exchange. An SSL handshake typically begins with the client and server exchanging information, such as, for example, SSL version number, cipher settings, random data, and other information needed for communication. During this initial exchange the server also sends a certificate to the client system.

One method to protect data being transferred between computer systems is to encrypt the data before it is sent, and decrypt the data after it is received. Thus, if data is intercepted as it travels over-the-wire the difficulty of deciphering the data can be increased, and depending on the type of encryption can be made nearly impossible. However, for encryption to be of benefit the sender and the receiver of the encrypted data must establish keys (secret codes typically used by computerized encryption algorithms) for both encrypting and decrypting data. Thus, computer systems will typically exchange a number of configuration parameters to establish these keys before any user related data is transferred. This initial exchange of configuration parameters is often refeffed to as a "handshake."

The server uses its private key to decrypt the premaster secret, and then both the server and the client, starting with the premaster secret, perform a series of operations to generate the master secret. Both the client and the server use the master secret to generate session keys, which are symmetric keys used to encrypt and decrypt information exchanged during an SSL session. The client sends a message to the server informing the server that future messages from the client will be encrypted with the session key. Likewise, the server sends a message to the client indicating that future messages from the server will be encrypted with the session key. Thus, eventually the SSL handshake sequence completes and the client and server can exchange encrypted data.

A considerable amount of processing and data exchange must be performed (i.e., the entire SSL handshake sequence) before a secure session is established and any encrypted data can be transferred between the client and server. This processing and data exchange consumes both computer system and network bandwidth resources. Further, since SSL is a state based protocol some information must be maintained in the system memories of both the client and the server for the duration of the secure connection.

Therefore systems, methods, computer program products, and data structures for establishing secure communication between computer systems in a manner that conserves both computer system and network bandwidth resources would be advantageous.

BRIEF SUMMARY OF THE INVENTION

The foregoing problems with the prior state of the art are overcome by the principles of the present invention, which are directed towards methods, systems, computer program products, and data structures for including a significant portion of the information needed to securely process a message within the message.

An application server and an authentication server establish a shared service key that is known to both the application server and the authentication server but that may not be known to a client. A shared service key can be established using virtually any form of communication. If the need is more immediate, a shared service key can be established through network communication between the application server and the authentication server. Alternately, a shared service key can be established using telephonic or postal type communications.

The client sends a request to the authentication server indicating a desire to access a service at the application server. The request can include credentials that result in the authentication server sending key data to the client. The key data can then be processed at the client to generate an unencrypted session key. Alternately, if the client previously sent credentials to the authentication server, an unencrypted session key may already be stored at the client.

In response to the request, the client receives a binary token from the authentication server. The binary token contains an encrypted session key that was encrypted using the shared service key and that corresponds to the unencrypted session key. That is, were the encrypted session key to be decrypted it would reveal the unencrypted session key stored at the client. The client uses the unencrypted session key to encrypt application data that is to be delivered to a service at the application server. The client then text-encodes the encrypted application data to generate corresponding text-encoded encrypted application data and text-encodes the binary token to generate a corresponding text-encoded token that contains the encrypted session key.

The client sends a message, such as, for example, a Simple Object Access Protocol ("SOAP") envelope, that includes the text-encoded encrypted application data and the text-encoded token, to the application server. The application server receives the message. The application server decodes the text-encoded token to expose the corresponding binary token containing the encrypted session key. Likewise, the application server decodes the text-encoded encrypted application data to expose the corresponding encrypted application data. The application server then decrypts the encrypted session key (using the shared service key) to reveal the corresponding unencrypted session key.

The unencrypted session key is then used to decrypt the encrypted application data to reveal the corresponding unencrypted application data. The unencrypted application data can be delivered to a service that is indicated in the message.

Since the secret code (i.e., the session key) needed to decrypt application data included in the message is also included in the message, the security associated with an electronic message can be increased without having to perform a handshaking sequence or maintaining state information. This conserves computer system resources, which may then potentially be allocated to other processing functions. Further, since electronic messages are text-encoded, the flexibility associated with text based electronic messaging schemes can be utilized.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for including a significantly portion of the information needed to securely process a message within the message. A client sends a request to an authentication server requesting access to a service at an application server. The authentication server returns a token containing an encrypted version of a session key that was encrypted using a secret that shared between the authentication server and the application server.

The client encrypts application data using a corresponding unencrypted version of the session key and text-encodes both the encrypted application data and the encrypted version of a session key. The text-encoded application and text-encoded encrypted version of the session key are both included in a message and sent to the application server. The application server decrypts the encrypted version of the session key using the shared secret so as to reveal the unencrypted version of the session key. The application server then decrypts the encrypted application data using the revealed unencrypted version of the session key.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems can exchange data with each other. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

In this description and in the following claims, a "logical communication link" is defined as any communication path that may enable the transport of electronic data between two entities such as computer systems or modules. The actual physical representation of a communication path between two entities is not important and may change over time. A logical communication link may include portions of a system bus, a local area network, a wide area network, the Internet, combinations thereof, or portions of any other path that may facilitate the transport of electronic data. Logical communication links may include hardwired links, wireless links, or a combination of hardwired links and wireless links. Logical communication links may also include software or hardware modules that condition or format portions of data so as to make them accessible to components that implement the principles of the present invention. Such components may include, for example, proxies, routers, firewalls, or gateways. Logical communication links may also include portions of a Virtual Private Network ("VPN").

In this description and the following claims, "encryption" and "encrypting" are defined as using a secret code to convert data from a form that is less difficult for unauthorized entities to understand into a form that is more difficult for unauthorized entities to understand. It some cases, this can include converting unencrypted data (e.g., clear text data) into encrypted data. However, it should be understood that encrypted data can be further encrypted to make understanding by unauthorized entities even more difficult. There is essentially no limit to the number of times data can be encrypted.

In this description an in the following claims, "decryption" and "decrypting" are defined as using a secret code to convert data from a form that is more difficult for unauthorized entities to understand into a form that is less difficult for unauthorized entities to understand. Decrypting data essentially reverses the effects of encrypting data. In some cases, this can include converting encrypted data into unencrypted data (e.g., into clear text data). However, if data has been encrypted a number of times, the data may need to be corresponding decrypted an equal number of times before it is unencrypted.

It may be that a first secret code used to encrypt data and a corresponding second secret code used to decrypt data that was encrypted using the first secret code are symmetric. That is, the first secret code and the corresponding second secret code are the same secret code. Thus, any entity that has the secret code can decrypt data that was encrypted using the secret code.

In this description an in the following claims, "decryption" and "decrypting" are defined as using a secret code to convert data from a form that is more difficult for unauthorized entities to understand into a form that is less difficult for unauthorized entities to understand. Decrypting data essentially reverses the effects of encrypting data. In some cases, this can include converting encrypted data into unencrypted data (e.g., into clear text data). However, if data has been encrypted a number of times, the data may need to be correspondingly decrypted an equal number of times before it is unencrypted.

In this description and in the following claims, a "key" is defined as a secret code used by a module to encrypt data or decrypt data. The principles of the present invention can be implemented using keys of many different sizes, such as, for example, 40-bit, 80-bit, 56-bit, 128-bit, and 168-bit. However, it should be understood that the listed key sizes are merely examples. In would be apparent to one skilled in the art, after having reviewed this description, that a wide variety of different key sizes, in addition to those listed, may be used to implement encryption and/or decryption in accordance with the present invention.

In this description and in the following claims, an "encryption module" is defined as a module that encrypts data.

In this description and in the following claims, a "decryption module" is defined as a module that decrypts data.

Encryption modules and decryption modules may be implemented to execute any of a wide variety of cryptographic algorithms or portions thereof, such as, for example, Data Encryption Standard ("DES"), Digital Signature Algorithm ("DSA"), Key Exchange Algorithm ("KEA"), Message Digest Algorithm ("MD5"), Rivest Encryption Ciphers ("RC2" and "RC4"), RSA, Secure Hash Algorithm ("SHA-1"), SKIPJACK, Triple-DES, and Pretty Good Privacy ("PGP"). It should be understood that the listed cryptographic algorithms are merely examples. In would be apparent to one skilled in the art, after having reviewed this description, that a wide variety of cryptographic algorithms, in addition to those listed, may be used to implement encryption and/or decryption in accordance with the present invention. It should further be understood that a plurality of cryptographic algorithms may be used in combination. For example, DES encryption may be used with MD5 message authentication. Likewise, data may be encrypted a plurality of times using different cryptographic algorithms. For example, data may be encrypted using RSA and then further encrypted using RC4.

In this description and in the following claims, "encoding" is defined as representing a numeric value as a corresponding character of text according to a defined rule. For example, a rule may define that the hexadecimal value 61 is represented by the corresponding character 'a'. If a computer system that has implemented the rule is performing a character operation and receives a hexadecimal value of 61, the computer system can interpret this to be the character 'a'.

Text can be encoded using virtually any technique that corresponds a numeric value with the representation of a text character. It may be that, a character set, such as, for example, the American Standard Code for Information Exchange ("ASCII"), ISO Latin 1, American National Standards Institute ("ANSI"), Unicode, or any number of character sets based on Japanese Industrial Standards (e.g., JIS X 0208-1990), defines a plurality rules for representing numeric values as characters of text. Thus, a plurality of different numeric values can be represented as a plurality of different corresponding characters of text. For example, the character 'b' may correspond to a hexadecimal value of 62 and the character 'c' may correspond to a hexadecimal value of 63, etc. It should be understood that the above list of character sets are not intended to be an exhaustive list of character sets. It would be apparent to one skilled in the art, after having reviewed this description, that the principles of the present invention can be implemented using virtually any character set.

Encoding can be implemented to convert binary data into text-encoded data. That is, the rules of a particular character set can be applied to binary data to cause numeric values within the binary data to be represented by corresponding character of texts. For example, if some portion of binary data includes a hexadecimal value of 66 this may be converted to the character 'f'. Encoding can also be implemented as identity encoding where a character of text is encoded as the character of text. For example, using identity encoding, the character 'a' would be converted to the character 'a'.

In this description and in the following claims, "decoding" is defined as reversing the effects of encoding, such as, for example, removing the association between a numeric value and a corresponding character of text. Decoding can be implemented to convert text-encoded data into binary data. That is, the rules of a particular character set can be reversed and applied to text-encoded data to cause the characters of text within the text-encoded data to revert to numeric values. For example, if some portion of the text data includes the character 'k' this may be converted to a hexadecimal value of 71. Decoding can be implemented as identity decoding where a character of text is decoded into the character of text. For example, using identity decoding the character 'a' would be decoded to the character 'a'.

In this description and in the following claims, "server" is defined as a computer system that provides a service to another computer system. In this description and in the following claims, "client" is defined as a computer system that uses a service provided by another computer system. It should be understood that a computer system can be both a client and server. That is, a computer system may use a service of another computer system while also providing a service to other computer systems.

Those skilled in the art will appreciate that the invention may be practiced in network computing environments with many types of computer system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

Figure 1:
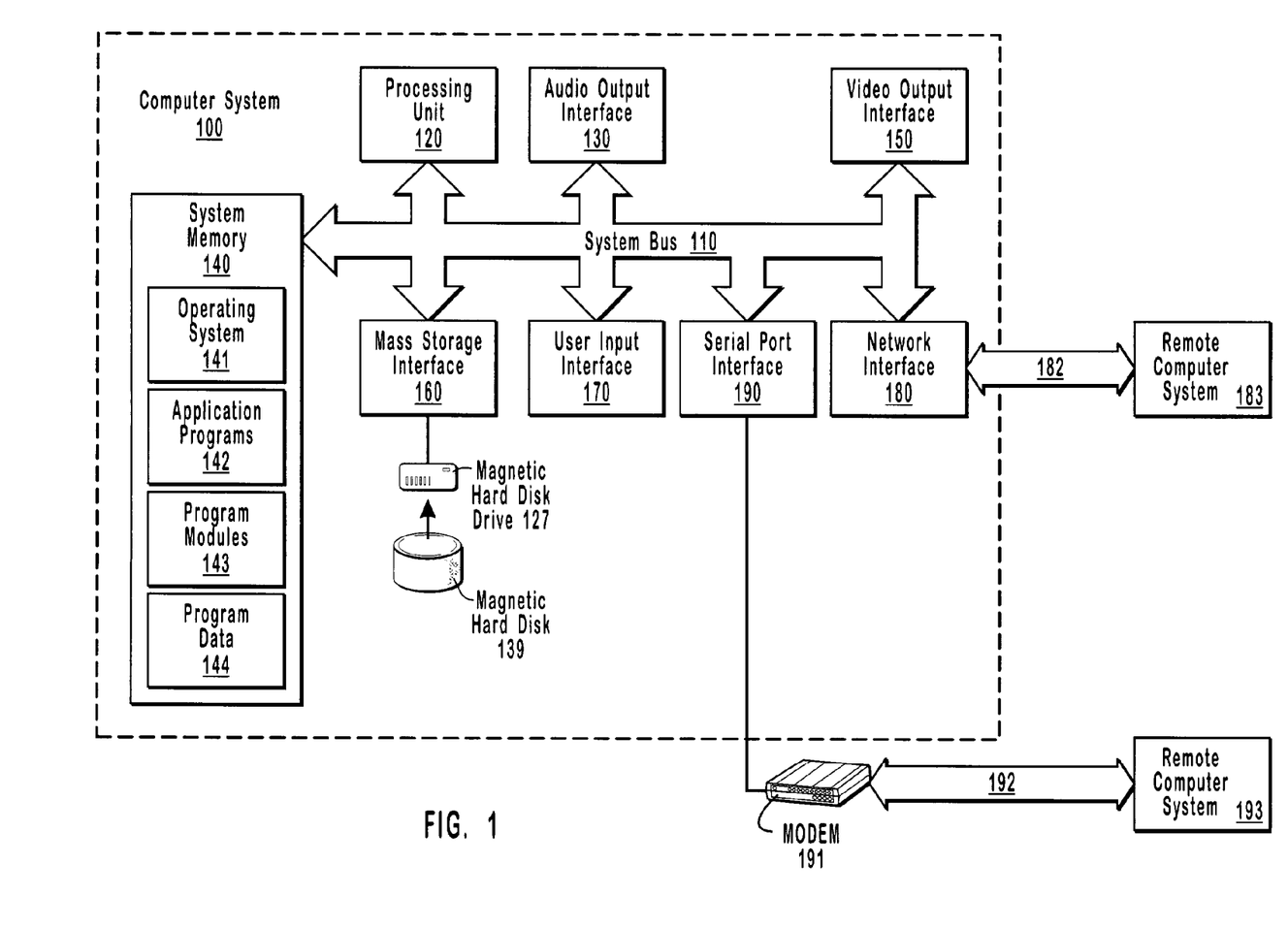
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a computer system 100. Computer system 100 may be a personal computer that has been adapted to perform the operations disclosed herein. It should be understood that computer system 100 is merely an example of one possible computer system configuration that can be used to practice the principles of the present invention.

Computer system 100 includes a user input interface 170 that receives information from an input device, such as, for example, a keyboard, microphone, or mouse. An input device can be coupled to user input interface 170 so as to enable the entry of information. An input device can transfer information over such a coupling in response to preprogrammed data or user manipulation of the input device.

Computer system 100 can also include video output interface 150, which provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules and other data for computer system 100. For example, magnetic hard disk 139 can store one or more program modules including operating system 141, application programs 142, other program modules 143, and program data 144.

Computer system 100 can be network connectable to networks, such as, for example, an office-wide or enterprise-wide computer network, an intranet and/or the Internet. Computer system 100 can exchange data with external sources, such as, for example, remote computer systems and/or databases over such a network.

Computer system 100 includes network interface 180, through which computer system 100 receives data from external sources and/or transmits data to external sources. As illustrated in FIG. 1, network interface 180 facilitates the exchange of data with remote computer system 183 via logical communication link 182. Logical communication link 182 represents a portion of a network, and remote computer system 183 represents a node of the network. For example, remote computer system 183 can be a client, an application server, or an authentication server.

Likewise, computer system 100 includes serial port interface 190, through which computer system 100 receives data from external sources and/or transmits data to external sources. Serial port interface 190 is coupled to modem 191 via logical communication link 159, through which computer system 100 receives data from and/or transmits data to external sources. As illustrated in FIG. 1, serial port interface 190 and modem 191 facilitate the exchange of data with remote computer system 193 via logical communication link 192. Logical communication link 192 represents a portion of a network, and remote computer system 193 represents a node of the network. For example, remote computer system 193 can be a client, an application server, or an authentication server.

Alternatively, computer system 100 can exchange data with external sources through other interfaces, such as, for example, a parallel port, a game port, or a universal serial bus ("USB") port.

It should be understood that the described network connections are merely examples. It would be apparent to one skilled in the art, after having reviewed this description, that a wide variety of network connection techniques, in addition to those described with reference to FIG. 1, may be used to facilitate the exchange of data between computer system 100 and external sources.

While FIG. 1 represents a suitable operating environment for the present invention, the principles of the present invention may be employed in any computer system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, encryption modules, decryption modules, encoding modules, decoding modules, and services, as well as associated data, including session keys, service keys, tokens, and application data may be stored and accessed from any of the computer-readable media associated with computer system 100. For example, portions of such modules and portions of associated program data may be included in operating system 141, application programs 142, program modules 143 and/or program data 144, for storage in system memory 140. When a mass storage device, such as, for example, magnetic hard disk 139, is coupled to computer system 100, such modules and associated program data may also be stored in the mass storage device.

In a networked environment, program modules depicted relative to computer system 100, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2:
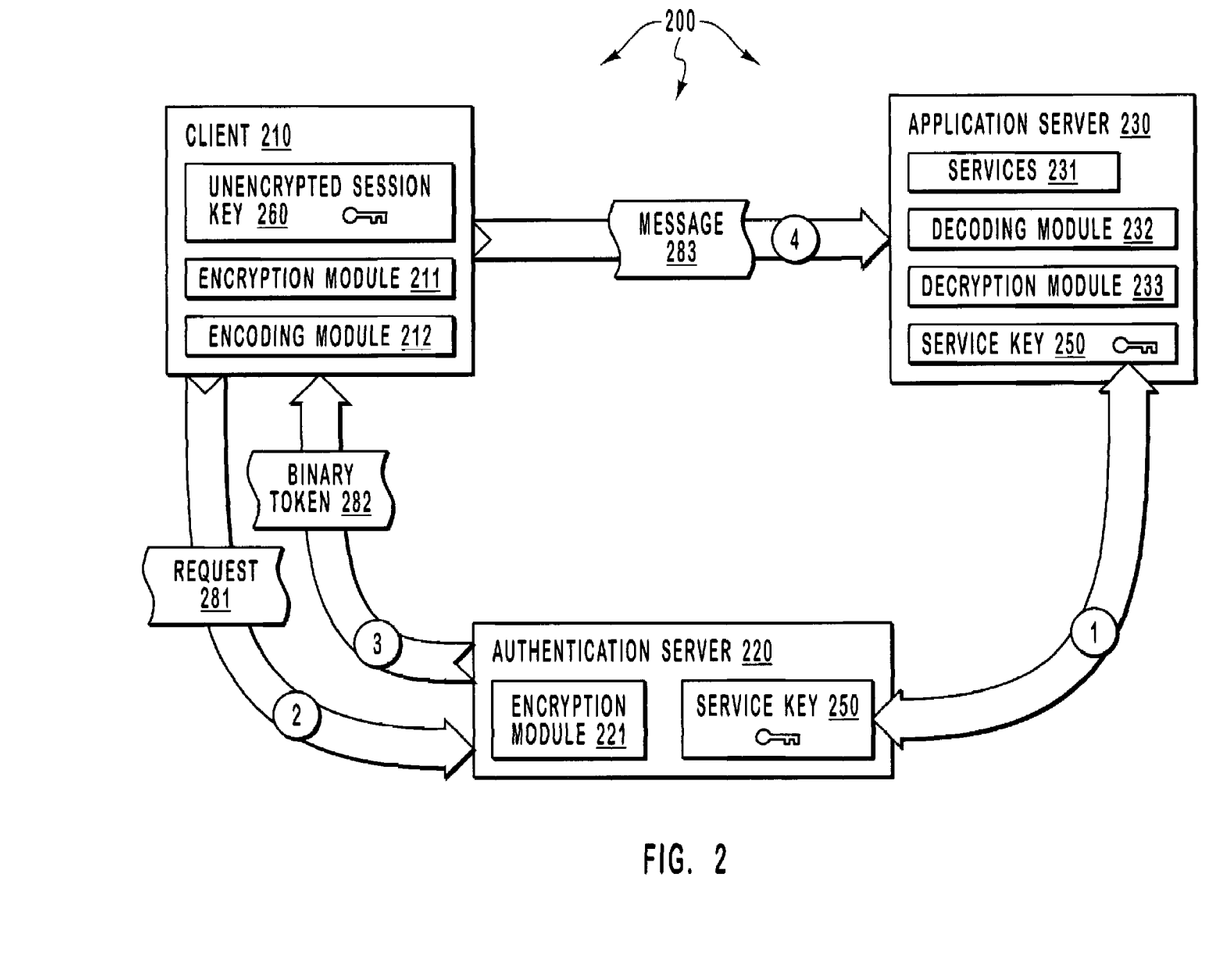
FIG. 2 illustrates an example of a network architecture that can facilitate client access to a service at an application server.

FIG. 2 illustrates an example of network architecture 200 that includes client 210, authentication server 230, and authentication server 220 which can communicate via logical communication links to implement the principles of the present invention.

Authentication server 220 includes encryption module 221 and service key 250. Encryption module 221 can encrypt session keys using service key 250 and can include encrypted session keys within binary tokens that are sent to clients (e.g., client 210). Service key 250 can be a service key that is shared between authentication server 220 and application server 230. Optionally, authentication server 220 can function as a key escrow and store session keys (not shown) that have been distributed to clients. For example, authentication server 220 could store unencrypted session key 260.

Client 210 includes unencrypted session key 260, encryption module 211, and encoding module 212. Client 210 further includes the functionality to generate application data (both binary and text-encoded data) that is to be delivered to a service (e.g., a service included in services 231). Encryption module 211 can encrypt data that is accessed by client server 210. For example, encryption module 211 can use session keys, such as unencrypted session key 260, to encrypt generated application data. Encoding module 212 can encode binary data that is accessed at client 210 into text-encoded data. This can include encoding binary application data into text-encoded application data and encoding binary tokens (e.g. binary tokens received from authentication server 210) into text-encoded tokens. Client 220 can include text-encoded application data and text-encoded tokens in messages that are transferred to servers (e.g., application server 230).

Application server 230 includes services 231, decoding module 232, decrypting module 233, and service key 250. Services 231 can include one or more services, such as, for example, financial services, web services, news services, and the like, that are available to clients (e.g., client 220). Decoding module 232 can decode text-encoded data in binary data. This can include decoding text-encoded application data into binary application data and decoding text-encoded tokens into binary tokens. It may be that decoding module 232 is configured to reverse the effects of encoding module 212. That is, if encoding module 212 encoded a particular numeric value to a particular character of text, decoding module 232 would decode the particular character of text to cause it to revert to the particular numeric value. For example, if encoding module 212 encoded the numeric value 22 to the character 'z,' decoding module 232 would decode the character 'z' to cause it to revert to the numeric value 22.

Decryption module 233 can decrypt encrypted data that is received at application server 230. It may be that decryption module 233 is configured to decrypt data that was encrypted using service keys (e.g., service key 250), to decrypt data that was encrypted using a session key (e.g., unencrypted session key 260), and/or to decrypt data that was encrypted by a particular encryption module (e.g., encryption module 211).

Application server 230 can deliver application data to services included in services 230. This can include delivering binary data that results from decoding module 232 decoding text-encoded application data and can include delivering unencrypted data that results from decryption module 232 decrypting encrypted application data.

Figure 3:
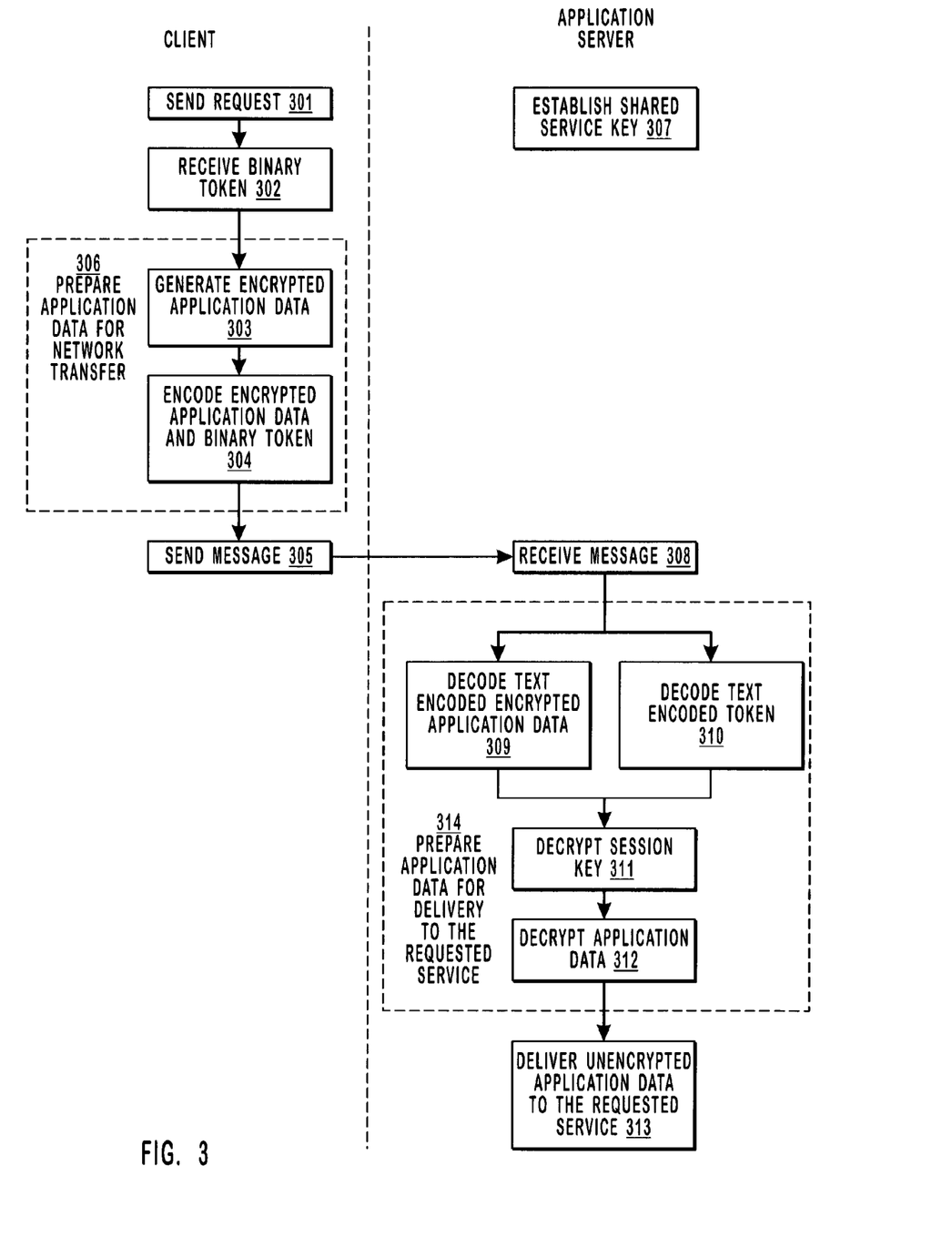
FIG. 3 illustrates a flowchart of a method for composing, transferring, and processing a message that includes both security data for accessing a service and application data that is to be delivered to the service.

FIG. 3 illustrates a flowchart of a method for composing, transferring, and processing a message that includes both security data for accessing a service and application data that is to be delivered to the service. The method in FIG. 3 will be described with respect to the functional components of network architecture 200.

The method in FIG. 3 includes an act of sending a request (act 301). This can include sending a request, such as, for example, a HyperText Transfer Protocol ("HTTP") or Kerberos protocol request, that indicates a desire to access a service at an application server. As shown by arrow 2 in FIG. 2, this can include client 210 sending request 281 to authentication server 220. Sending a request to authentication server 220 can include sending credentials, such as, for example, a user name and password, that result in the authentication server 220 returning key data or a key to client 210. If key data is returned to client 210, this key data can be processed at locally at client 210 to generate an unencrypted version of a session key, such as, for example, unencrypted session key 260. Alternately, if client 210 previously sent credentials authentication server 220, an unencrypted session key 260 may already be stored at the client 210.

Further, authentication server 220 may maintain key data or session keys that are sent to clients. When subsequent requests are received from a client, authentication server 220 is able to correlate the client with the maintained key data or session key and if desirable can manipulate the key data or session key. For example, in combination with authentication server 220 sending unencrypted session key 260 to client 210, authentication server may also store key data associated with unencrypted session key 260 and/or store a copy of unencrypted session key 260. Thus, in response to receiving client 210's request to access a service, encryption module 221 can use service key 250 to generate an encrypted version of session key 260 (by manipulating a stored version of unencrypted session key 260 and/or corresponding key data). Authentication server 220 can include the encrypted version of session key 260 along with other connection data in a token.

Figure 4:
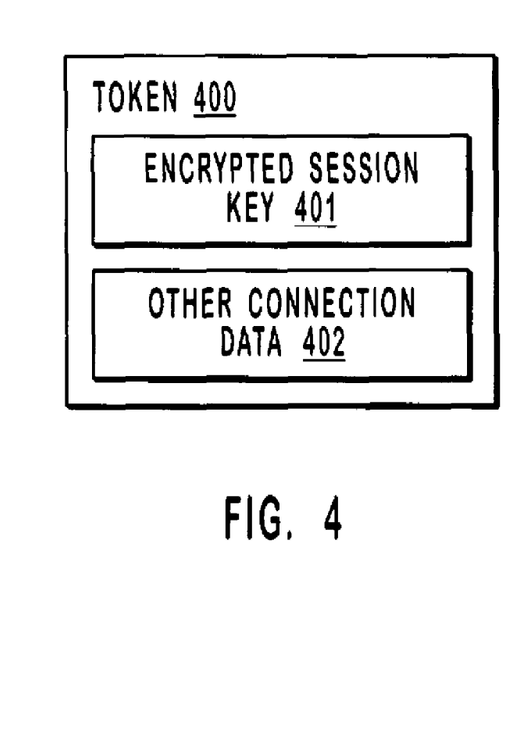
FIG. 4 illustrates an example of a token that can be returned to a client in response to a request to access a service.

Illustrated in FIG. 4 is token 400. Token 400 is an example of one format of token that can be used when implementing the principles of the present invention. Token 400 includes encrypted session key 401 (e.g., the encrypted version of session key 260) and other connection data 402. Other connection data 402 can include data on how the requested service (e.g., the server requested by request 281) should be accessed, such as, for example, routing data on where the service is located. Other connection data 402 can also include an expiration time after which the intended recipient (e.g. a service) will not honor the token. When a token expires, another token using potentially different key data can be generated and sent to a client.

In some implementations, token 400 may be encrypted. This can result in encrypted session key 401 being encrypted a plurality of times. For example, encrypted session key 401 may be encrypted with service key 250 and then, after being included in token 400, further encrypted using the key and method used to encrypt token 400. Token 400 can be a binary token such that the contents of token 400 are transported as numeric values. Likewise, token 400 can be a text-encoded token such that the contents of token 400 are transported as characters of text.

Illustrated in FIG. 4 is token 400. Token 400 is an example of one format of token that can be used when implementing the principles of the present invention. Token 400 includes (e.g., a field representing) encrypted session key 401 (e.g., the encrypted version of session key 260) and (e.g., a field representing) other connection data 402. Other connection data 402 can include data on how the requested service (e.g., the server requested by request 281) should be accessed, such as, for example, routing data on where the service is located. Other connection data 402 can also include an expiration time after which the intended recipient (e.g. a service) will not honor the token. When a token expires, another token using potentially different key data can be generated and sent to a client.

The method in FIG. 3 includes a functional, result-oriented step for preparing application data for network transfer (step 306). Step 306 may include any corresponding acts for accomplishing the result of preparing application data for network transfer. However, in the illustrated example of FIG. 3, the step 306 includes a corresponding act of generating encrypted application data (act 303). Client 210 may generate application data (e.g., as a result of receiving user input or receiving communication via a logical communication link from some other computer system) that is to be delivered to a service included in services 231. Encryption module 211 can use unencrypted session key 260 to encrypt this generated application data.

As illustrated in FIG. 3, step 306 also includes a corresponding act of encoding the encrypted application data and the binary token (act 304). Encoding module 212 can encode the application data that was encrypted in act 302 into text-encoded encrypted application data. Likewise, encoding module 212 can encode binary token 282 into a text-encoded token. It should be understood that although the binary token 282 was encoded into text format, an encrypted version of session key 260 (as well as an other connection data) is still contained within the resultant text-encoded token.

Figure 5:
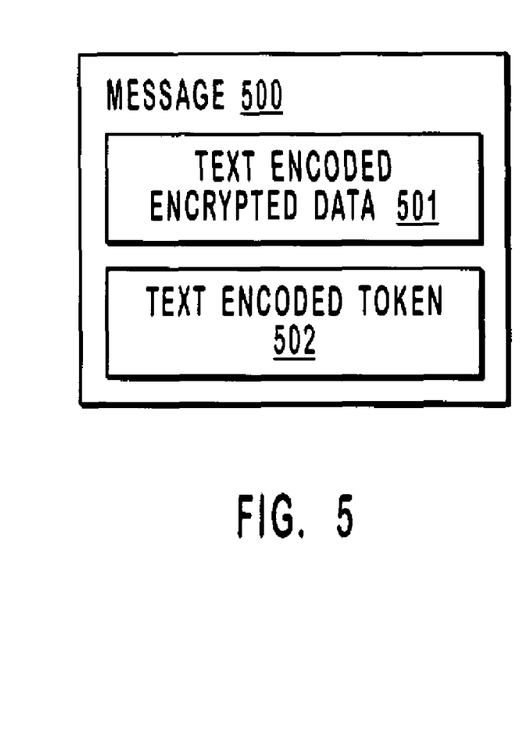
FIG. 5 illustrates an example of a message that can be sent from a client to an application server to gain client access to a service at the application server.

The method in FIG. 3 also includes an act of sending a message (act 305). This can include sending a message that includes the text-encoded encrypted application data and the text-encoded token. For example, as shown by arrow 4 in FIG. 2, client 210 sends message 283 to application server 230. Illustrated in FIG. 5 is message 500. Message 500 is an example of one format of message that can be used to implement the principles of the present invention. Message 500 includes text-encoded encrypted data 501 and text-encoded token 502. Message 283 can be a message that is of a format similar to message 500.

It should be understood that the present invention is not limited to messaging using any specific transport protocol and format. However, one example protocol that may be used to implement the principles of the present invention is called Simple Object Access Protocol ("SOAP"). Message 283 may be a SOAP message that uses any number of lower level protocols, such as, for example, HyperText Transfer Protocol ("HTTP") or Direct Internet Message Encapsulation ("DIME") as a transport. The following is an example structure in which text-encoded encrypted application data and a text-encoded token are included within the body a SOAP envelope:

```
1.   <Envelope>
2.     <Header>
3.       .
4.       .
5.       <Encryption>
6.         CLEAR TEXT ENCRYPTION DATA
7.       <Encryption>
8.       .
9.       .
10.      <Authentication>
11.        CLEAR TEXT AUTHENTICATION DATA
12.      </Authentication>
13.      .
14.      .
15.      <Sign>
16.        CLEAR TEXT SIGN DATA
17.      </Sign>
18.      .
19.      .
20.    </Header>
21.    <Body>
22.      .
23.      .
24.      TEXT-ENCODED ENCRYPTED APPLICATION DATA
25.      .
26.      .
27.      TEXT-ENCODED TOKEN CONTAINING ENCRYPTED SESSION KEY
28.      .
29.      .
30.    </Body>
31.  </Envelope>
```

The method in FIG. 3 also includes an act of sending a message (act 305). This can include sending a message that includes (e.g., a field representing) the text-encoded encrypted application data and (e.g., a field representing) the text-encoded token. For example, as shown by arrow 4 in FIG. 2, client 210 sends message 283 to application server 230. Illustrated in FIG. 5 is message 500. Message 500 is an example of one format of message that can be used to implement the principles of the present invention. Message 500 includes text-encoded encrypted data 501 and text-encoded token 502. Message 283 can be a message that is of a format similar to message 500.

The example SOAP envelope includes an Encryptionelement, an Authentication element, and a Sign element. These elements may be included in a header portion of the SOAP envelope or in the body. However, inclusion of these elementswithin the example SOAP envelope (or any other message) is optional. These elements are included merely to illustrate one example of some of the elements that can be used to implement the principles of the present invention. Depending on the desired functionality none, one, some, or all of theseelements, can be included in a message. Further, it would be apparent to one skilled in the art, after having reviewed this description, that a wide variety of elements, in addition to the illustrated elements, can be used to implement the principles of the present invention.

As can be seen, some portions of the example SOAP envelope (e.g., line 24 and part of line 27) are encrypted, while other portions of the example SOAP envelope (e.g., lines 6, 11, and 16) are in clear text. Encryption elements, such as, for example, "<Encryption>" and "</Encryption>", can be included in the header portion of a SOAP envelope. Within these headers, Clear Text Encryption Data can be included to indicate to an application server (or other computer system) the different portions of the SOAP envelope that are encrypted and the algorithms that can be used to decrypt the different encrypted portions.

Some portions of a SOAP envelope can be signed, while other portions of a SOAP envelope are unsigned. For example, data in the body portion of a SOAP envelope (e.g., text-encoded encrypted application data and/or text-encoded tokens) can be signed, while data in the header portion of a SOAP envelope is not signed. Sign elements, such as, for example, "<Sign>" and "</Sign>", can be included in the header portion of a SOAP envelope. Within these headers Clear Text Sign Data can be included to indicate to an application server (or other computer system) the different portions of a SOAP envelope that are signed and the algorithms that can be used to determine if a signed portion has been tampered with.

For example, it may be undesirable to sign data in the header portion of a SOAP envelope because this data (e.g., routing data) may change as function of sending the message. On the other hand, it may be desirable to sign the Text-Encoded Encrypted Application Data so that an application server (or other computer system) can verify the integrity of the Text-Encoded Encrypted Application Data when it is received. As such, Clear Text Sign Data can indicate when Text-Encoded Encrypted Application Data is signed and can further indicate the algorithm that was used to sign Text-Encoded Encrypted Application Data. It may also be that different portions of a SOAP envelope are signed using different algorithms. In these cases, Clear Text Sign Data can indicate when different portions of a SOAP envelope have been signed and what algorithms have been used to sign the different portions.

Further, some portions of a SOAP envelope can be authenticated, while other portions of a SOAP envelope are not authenticated. For example, data in the body portion of a SOAP envelope (e.g., text-encoded encrypted application data and/or text-encoded tokens) can be authenticated, while data in the header portion of a SOAP envelope is not authenticated or vice-versa. Authentication elements, such as, for example, "<Authentication>" and "</Authentication>", can be included in the header portion of a SOAP envelope. Within these headers Clear Text Authentication Data can be included to indicate to an application server (or other computer system) the different portions of a SOAP envelope that are associated with authentication and the types of authentication used to authenticate the different portions of a SOAP envelope.

It should be understood that the arrangement of elements and data in the example SOAP envelope (or any other electronic message) is not important. For example, Encryption, Authentication, and/or Sign elements (and corresponding data) can be included in the body portion of an electronic message. Likewise, text-encoded encrypted application data and/or text-encoded tokens can be included in the header portion of an electronic message. It may also be that an electronic message does not include separate header and body portions and thus elements and data can simply be arranged as desired within the electronic message.

Returning back to FIG. 3, the method in FIG. 3 includes an act of establishing a shared service key (act 307). This can include establishing a shared service key with an authentication server. As shown by arrow 1 in FIG. 1, a shared service key 250 is established between authentication server 220 and application server 230. A shared service key can be established using virtually any method of communication. It may be that application server 230 and authentication server 220 communicate with electronic messages via a logical communication link to establish a shared service key. However, other communication methods, such as, for example, telephonic or postal type communication between administrators of application server 230 and authentication server 220, can be utilized. Client 210 may or may not have knowledge of shared service key 250.

It may be that application server 230 provides a plurality of services, which are each included in services 231. As such, each of the included services can appropriately communicate with authentication server 220 (or with any other authentication server) to establish a service key (or service keys). Thus, application server 230 may establish a plurality of service keys with authentication server 220 (as well as with other authentication servers). Service key 250 is an example of one of these established service keys.

The method in FIG. 3 also includes an act of receiving a message (act 308). As shown by arrow 4 in FIG. 2, application server 230 receives message 283 from client 210.

The method in FIG. 3 includes a functional, result-oriented step for preparing application data for delivery to the requested service (step 314). Step 314 may include any corresponding acts for accomplishing the result of preparing application data for the selected service. However, in the illustrated example of FIG. 3, the step 314 includes a corresponding act of decoding text-encoded encrypted application data (act 309). Decoding module 232 can retrieve text-encoded encrypted application data from message 283 and decode the text-encoded encrypted application data into encrypted application data. As illustrated in FIG. 3, the step 314 also includes a corresponding act of decoding the text-encoded token (act 310). Decoding module 232 can retrieve the text-encoded token from message 283 and decode the text-encoded token into a binary token. It should be understood that although the text-encoded token has been decoded into a binary token, the binary token still contains an encrypted session key.

As illustrated in FIG. 3, step 314 also includes a corresponding act of decrypting the session key (act 311). This can optionally include decrypting the binary token, if the binary token was encrypted after the encrypted session key was included in the binary token. Decryption module 232 can decrypt the binary token so as to reveal an unencrypted binary token. Act 311 can also include decryption module 233 using service key 250 to decrypt the encrypted version of the session key 260 contained in the (unencrypted) binary token. This results in an unencrypted session key essentially the same as unencrypted session key 260 being revealed. As illustrated in FIG. 3, the step 314 also includes a corresponding act of decrypting the application data (act 312). Decryption module 233 can use the revealed unencrypted session key to decrypt the encrypted application data.

The method in FIG. 3 includes a functional, result-oriented step for preparing application data for delivery to the requested service (step 314). Step 314 may include any corresponding acts for accomplishing the result of preparing application data for the selected service. However, in the illustrated example of FIG. 3, the step 314 includes a coffesponding act of decoding text-encoded encrypted application data (act 309). Decoding module 232 can retrieve text-encoded encrypted application data from (a field of) message 283 and decode the text-encoded encrypted application data into encrypted application data. As illustrated in FIG. 3, the step 314 also includes a corresponding act of decoding the text-encoded token (act 310). Decoding module 232 can retrieve the text-encoded token from (a field of) message 283 and decode the text-encoded token into a binary token. It should be understood that although the text-encoded token has been decoded into a binary token, the binary token still contains an encrypted session key.

The method in FIG. 3 also includes an act of delivering unencrypted application data to the requested service (act 313). This can include delivering unencrypted application data to the service that was requested by request 281. This can be a service from among a plurality of services included in services 231.

It should be understood that the method in FIG. 3 can be performed for both requests (as previously described) and for responses. For example, after processing the unencrypted application data, it may be desirable for a service at application server 230 to respond to client 210 (e.g., with requested data). Thus, the method in FIG. 3 can be performed with application server 230 viewed as the client and with client 210 viewed as the application server.

Client 210 and an authentication server (e.g., authentication server 220) may have established a shared service key (or service keys). Application server 230 can send a request to the authentication server and in response can receive a binary token. Application server 230 can include the binary token along with response data within an electronic message (and appropriately encrypt and encode portions of the electronic message) that is sent to client 210. Client 210 can appropriately decode and decrypt the message to access the included response data.

Since application data along with security data (e.g., encryption, authentication, and signing data) needed to securely process the application data are both included in a message, the security associated with an electronic message can be increased without having to perform a handshaking sequence or maintaining state information. This conserves computer system resources, which may then potentially be allocated to other processing functions. Further, since electronic messages are text-encoded, the flexibility associated with text based electronic messaging schemes can be advantageously utilized.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer system that received data for generating an unencrypted version of a session key in response to authenticating with an authentication server, a method for including a significant portion of the information needed to process a message at an application server within the message, the method comprising:

an act of sending a request to the authentication server, the request indicating a desire to access a service at the application server;

an act of receiving a binary token from the authentication server, the binary token containing an encrypted version of the session key within the binary token, wherein the session key was encrypted by the authentication server using a service key that is shared between the authentication server and the application server;

an act of using the unencrypted version of session key to generate encrypted application data that is to be delivered to the service at the application server;

an act of encoding the encrypted application data and the binary token containing the encrypted version of the session key into a text format, wherein numeric values of the binary data are represented by corresponding text characters; and an act of sending, via a text-based electronic messaging scheme, a message that includes text-encoded encrypted application data and a text-encoded token which contains the encrypted version of the session key to the application server.

2. The method in accordance with claim 1, wherein the act of receiving a binary token from the authentication server comprises an act of receiving a data structure that includes a first field representing a encrypted session key and second field representing other connection data used for transferring the encrypted session key represented in the first field to the application server.

3. The method in accordance with claim 1, wherein the act of sending, via a text-based electronic messaging scheme, a message that includes text-encoded encrypted application data and a text-encoded token which contains the encrypted version of the session key comprises an act of sending a Simple Object Access Protocol envelope.

4. In an application server having one or more services that are accessible to clients, a method for processing a message to cause one of the one or more services to be accessed, the method comprising:

an act of establishing a shared service key with an authentication server;

an act of receiving a message that includes text-encoded encrypted application data that was encrypted by a client using a session key, wherein the message is to be processed by a service requested in the message and includes a text-encoded token containing an encrypted version of a session key that was encrypted by the authentication server;

an act of decoding the text-encoded token to expose a corresponding binary token that contains the encrypted version of the session key, wherein a text-encoded form of the token is decoded from a text form into a binary form of the token, wherein text characters of the text form of the token are converted to numeric values in the binary form of the token;

an act of decoding the text-encoded encrypted application data to expose corresponding encrypted application data;

an act of using the shared service key to decrypt the encrypted version of the session key contained within the binary token to reveal an unencrypted version of the session key;

an act of decrypting the encrypted application data using the decrypted session key to reveal unencrypted binary application data; and an act of delivering the unencrypted application data to the requested service.

5. The method in accordance with claim 4, wherein the act of establishing a shared service key with an authentication server comprises an act of establishing a shared service key that is unknown to the client that sent the received message.

6. The method in accordance with claim 4, wherein an act of receiving a message that includes text-encoded encrypted application data that is to be processed by a service requested in the message and includes a text-encoded token containing an encrypted version of a session key comprises an act of receiving a message that includes text-encoded encrypted application data that is to be processed by a service requested in the message and a data structure including a first field representing an encrypted session key and a second field representing other connection data used for transferring the encrypted session key represented in the first field to the application server.

7. The method in accordance with claim 4, wherein an act of receiving a message that includes text-encoded encrypted application data that is to be processed by a service requested in the message and includes a text-encoded token containing an encrypted version of a session key comprises an act of receiving a message that includes text-encoded encrypted application data that is to be processed by a service requested in the message and includes a text-encoded encrypted token containing an encrypted version of a session key.

8. The method in accordance with claim 7, further comprising:

an act of, prior to the act of using the shared service key to decrypt the encrypted version of the session key, decrypting an encrypted binary token that corresponds to the text-encoded encrypted token.

9. The method in accordance with claim 4, wherein an act of receiving a message that includes text-encoded encrypted application data that is to be processed by a service requested in the message and includes a text-encoded token containing an encrypted version of a session key comprises an act of receiving a Simple Object Access Protocol envelope.

10. The method in accordance with claim 9, wherein receiving a Simple Object Access Protocol envelope comprises an act of receiving a Simple Object Access Protocol envelope including one more headers representing security data associated with the text-encoded encrypted application data, wherein the headers can be processed by the application server to determine how to process the text-encoded encrypted application data.

11. The method in accordance with claim 9, wherein receiving a Simple Object Access Protocol envelope comprises an act of receiving a Simple Object Access Protocol envelope that includes a signing header with signing data, wherein the signing data indicates that a first portion of the Simple Object Access Protocol envelope is signed and a second portion of the Simple Object Access Protocol envelope is not signed.

12. A computer program storage product for use in a computer system that received data for generating an unencrypted version of a session key in response to authenticating with an authentication server, the computer program storage product having computer-executable instructions stored thereon that, when executed, cause one or more processors in the computer system to implement a method for including a significant portion of the information needed to process a message at an application server within the message, the computer program storage product comprising the following:

computer-executable instructions for sending a request to the authentication server, the request indicating a desire to access a service at the application server;

computer-executable instructions for receiving a binary token from the authentication server, the binary token containing an encrypted version of the session key within the binary token, wherein the session key was encrypted using a service key that is shared between the authentication server and the application server;

computer-executable instructions for using the unencrypted version of session key to generate encrypted application data that is to be delivered to the service at the application server;

computer-executable instructions for encoding the encrypted application data and the binary token containing the encrypted version of the session key into a text format, wherein numeric values of the binary data are represented by corresponding text characters; and computer-executable instructions for sending, via a text-based electronic messaging scheme, a message that includes text-encoded encrypted application data and a text-encoded token which contains the encrypted version of the session key to the application server.

13. A computer program storage product in accordance with claim 12, wherein computer-executable instructions for sending, via a text-based electronic messaging scheme, a message that includes text-encoded encrypted application data and a text-encoded token which contains the encrypted version of the session key further comprise computer-executable instructions for sending a message that includes a data structure with a first data field representing text-encoded encrypted application data and a second field representing a text encoded token that can be processed to reveal a session key for decrypting the text-encoded encrypted application data.

14. A computer program storage product in accordance with claim 12, wherein computer-executable instructions for receiving a binary token from the authentication server further comprise computer executable instructions for receiving a data structure that includes a first field representing a encrypted session key and second field representing other connection data used for transferring the encrypted session key to the application server.

15. A computer program storage product in accordance with claim 12, wherein computer-executable instructions for using the unencrypted version of the session key to generate encrypted application further comprise computer-executable instructions for using a symmetric key to encrypt application data.

16. A computer program storage product in accordance with claim 12, wherein computer-executable instructions for using the unencrypted version of session key to generate encrypted application data further comprise computer-executable instructions for using a public key which has a corresponding private key that can be used to decrypt data that is encrypted with the public key, to encrypt application data.

17. A computer program storage product in accordance with claim 12, wherein computer-executable instructions for sending, via a text-based electronic messaging scheme, a message that includes text-encoded encrypted application data and a text-encoded token which contains the encrypted version of the session key further comprise computer-executable instructions for sending a Simple Object Access Protocol envelope.

18. A computer program storage product in accordance with claim 17, wherein computer-executable instructions for sending a Simple Object Access Protocol envelope further comprise computer-executable instructions for sending a Simple Object Access Protocol envelope that includes one more headers representing security data associated with the text-encoded encrypted application data, wherein the headers can be processed by the application server to determine how to process the text-encoded encrypted application data.

19. A computer program storage product in accordance with claim 17, wherein computer-executable instructions for sending a Simple Object Access Protocol envelope further comprise computer-executable instructions for sending a Simple Object Access Protocol envelope that includes a header with signing data, wherein the signing data indicates that a first portion of the Simple Object Access Protocol envelope is signed and a second portion of the Simple Object Access Protocol envelope is not signed.

20. A computer program storage product in accordance with claim 12, further comprising:
    computer-executable instructions for encrypting the binary token.

21. A computer program storage product for use in an application server having one or more services that are accessible to clients, the computer program storage product having computer-executable instructions stored thereon that, when executed, cause one or more processors in the application server to implement a method for processing a message to cause one of the one or more services to be accessed, the computer program storage product comprising the following:
    computer-executable instructions for establishing a shared service key with an authentication server;
    computer-executable instructions for receiving a message that includes text-encoded encrypted application data that was encrypted by a client is to be processed by a service requested in the message and includes a text-encoded token containing an encrypted version of a session key that was encrypted by the authentication server;
    computer-executable instructions for decoding the text-encoded token to expose a corresponding binary token that contains the encrypted version of the session key, wherein a text-encoded form of the token is decoded from a text form into a binary form of the token, wherein text characters of the text form of the token are converted to numeric values in the binary form of the token;
    computer-executable instructions for decoding the text-encoded encrypted application data to expose corresponding encrypted application data;
    computer-executable instructions for using the shared service key to decrypt the encrypted version of the session key contained within the binary token to reveal an unencrypted version of the session key;
    computer-executable instructions for decrypting the encrypted application data using the decrypted session key to reveal unencrypted binary application data; and
    computer-executable instructions for delivering the unencrypted application data to the requested service.

22. The computer program storage product in accordance with claim 21, wherein computer-executable instructions for receiving a message that includes text-encoded encrypted application data that is to be processed by a service requested in the message and includes a text-encoded token containing an encrypted version of a session key further comprise computer-executable instructions for receiving a message that includes text-encoded encrypted application data that is to be processed by a service requested in the message and a data structure including a first field representing an encrypted session key and a second field representing other connection data used for transferring the encrypted session key represented in the first field to the application server.

23. The computer program storage product in accordance with claim 21, wherein computer-executable instructions for receiving a message that includes text-encoded encrypted application data that is to be processed by a service requested in the message and includes a text-encoded token containing an encrypted version of a session key further comprise computer-executable instructions for receiving a message that includes text-encoded encrypted application data that is to be processed by a service requested in the message and includes a text-encoded encrypted token containing an encrypted version of a session key.

24. The computer program storage product in accordance with claim 21, wherein computer-executable instructions for receiving a message that includes text-encoded encrypted application data that is to be processed by a service requested in the message and includes a text-encoded token containing an encrypted version of a session key comprises receiving a Simple Object Access Protocol envelope.

25. The computer program storage product in accordance with claim 24, wherein computer-executable instructions for receiving a Simple Object Access Protocol envelope further comprise computer-executable instructions for receiving a Simple Object Access Protocol envelope including one more headers representing security data associated with the text-encoded encrypted application data, wherein the headers can be processed by the application server to determine how to process the text-encoded encrypted application data.

26. The computer program storage product in accordance with claim 24, wherein computer-executable instructions for receiving a Simple Object Access Protocol envelope further comprise computer-executable instructions for receiving a Simple Object Access Protocol envelope that includes a header with signing data, wherein the signing data indicates that a first portion of the Simple Object Access Protocol envelope is signed and a second portion of the Simple Object Access Protocol envelope is not signed.

* * * * *